US006111516A

United States Patent [19]

Lee

[11] Patent Number: 6,111,516

[45] Date of Patent: Aug. 29, 2000

[54] KEY WITH A DISK ARRANGEMENT AND A METHOD FOR SETTING A LOCK TO IDENTIFY THE KEY FOR UNLOCKING A DOOR

[75] Inventor: Wante Lee, Taoyuan, Taiwan

[73] Assignee: Chieh-Pi Liu, Taipei Hsien, Taiwan

[21] Appl. No.: 09/073,901

[22] Filed: May 6, 1998

[51] Int. Cl.[7] .......... G06F 7/04

[52] U.S. Cl. .......... 340/825.31; 340/825.34; 235/458

[58] Field of Search .......... 340/825.31, 149; 235/458, 61.7 R; 250/229; 70/283, 278, 277

[56] References Cited

U.S. PATENT DOCUMENTS

| | | | |
|---|---|---|---|
| 4,144,523 | 3/1979 | Kaplit | 340/149 |
| 4,625,100 | 11/1986 | Smith | 235/458 |

*Primary Examiner*—Michael Horabik
*Assistant Examiner*—Alton Hornsby

[57] ABSTRACT

A disk arrangement is formed for a key by installing a plurality of disks, where each disk is either penetrable or non-penetrable by infrared light, into a plurality of through holes in the key. Selection of different types of disk for installation results in different disk arrangements for the key and the key is specified by its own disk arrangement. A lock is set to identify the key by detecting and storing the disk arrangement of the key by transmitting and receiving infrared light through the disks. The detected disk arrangement is stored in a memory device of the lock.

6 Claims, 3 Drawing Sheets

KEY WITH A DISK ARRANGEMENT AND A METHOD FOR SETTING A LOCK TO IDENTIFY THE KEY FOR UNLOCKING A DOOR

BACKGROUND OF THE INVENTION

1. Field of the Invention

The present invention relates to a key with a disk arrangement and a method for setting a lock to identify the key for unlocking; more particularly, the present invention relates to a key with a disk arrangement formed by installing a plurality of disks, where each disk is either penetrable or non-penetrable by infrared light, into a plurality of through holes in the key and a method for setting a lock to identify the key by detecting and storing the combination of disks in the key for unlocking a door equipped with the lock.

2. Description of Related Art

The use of keys and locks is very common to human life today. A lock is usually equipped in a door to prevent burglars from entering a house. Conventionally, a lock normally works with a specific key. The specific key can be only inserted into the corresponding lock and turned for unlocking a door. However, the use of conventional locks and keys has the following disadvantages:

1. Because a lock only works with a specific key, a person usually needs to bring several keys with him if there are several doors to be opened in his house.

2. When a key is lost, a professional locksmith must be called in for unlocking the door and, in the worst case, the lock must be replaced if there is no backup key.

3. A landlord has to replace a lock when tenants are changed to prevent any potential intruder.

4. When a wrong key is inserted into a lock, no alarm is generated for alerting the resident the resident of the burglars.

SUMMARY OF THE INVENTION

The present invention provides a key with a disk arrangement and a method for setting a lock to identify the key for unlocking. As such, the general purpose of the present invention is to provide a key that can be identified by several different locks and to provide a lock that can identify several different keys. To attain this, the present invention adopts a key with a disk arrangement formed by installing a plurality of disks, where each disk is either penetrable or non-penetrable by infrared light, into a plurality of through holes in the key. Selection of different types of disk for installation results in different disk arrangements for the key and the key is specified by its own disk arrangement. A lock is set to identify the key by detecting and storing the disk arrangement of the key by transmitting and receiving infrared light through the disks. The detected disk arrangement is stored in a memory device of the lock.

DETAILED DESCRIPTION OF PREFERRED EMBODIMENT

Figure 1:
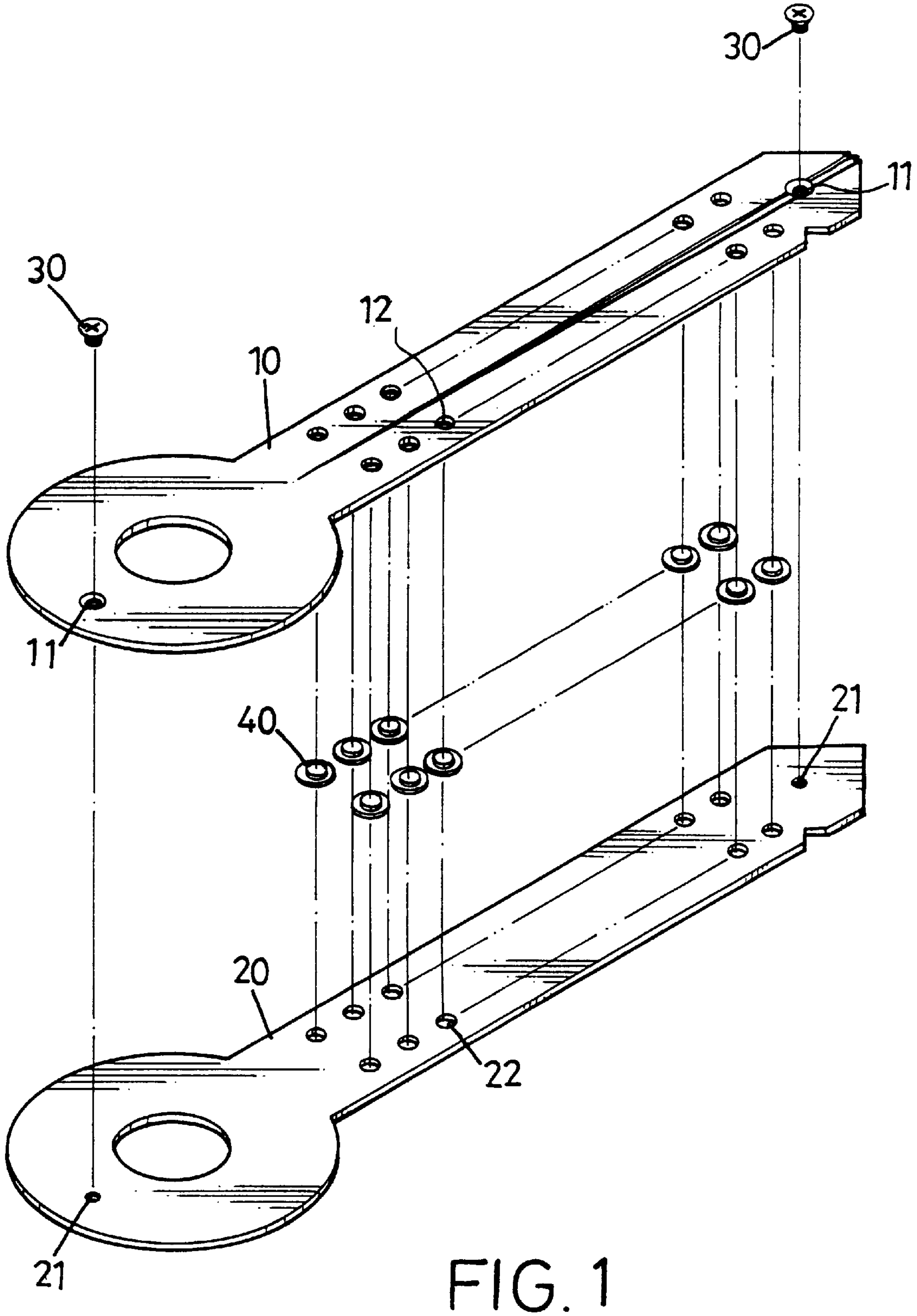
FIG. 1 is an exploded view of a key in accordance with the present invention.
Figure 2:
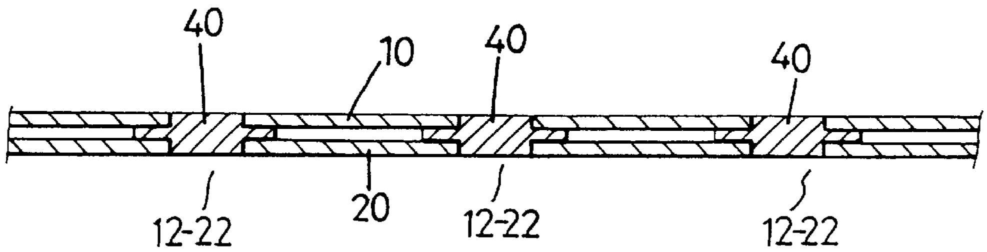
FIG. 2 is an enlarged cross sectional view of a key in accordance with the present invention.

Referring to FIG. 1 and FIG. 2, the key of the present invention comprises an upper key piece 10 having a plurality of holes 12 and a lower key piece 20 having a plurality of holes 22, the lower key piece 20 being releasably secured to the upper key piece 10. The holes 12 of the upper key piece 10 are corresponding to the holes 22 of the lower key piece 20 one by one so that a plurality of through holes 12–22 are defined in the key when the upper key piece 10 is securely combined with the lower key piece 20. The reason for having an upper key piece 10 and a lower key piece 20 for the key is that it is then easy to install a plurality of disks 40 in the through holes 12–22 of the key. The installation of disks 40 is achieved by putting disks 40 between holes 12 of the upper key piece 10 and holes 22 of the lower key piece 20 before the upper key piece 10 and the lower key piece 20 are securely combined. The upper key piece 10 and the lower key piece 20 are then securely combined to firmly hold the disks 40. The disks 40 installed in the through holes 12–22 of the key are thin enough so that they do not protrude from the surfaces of the key. Moreover, two first screw holes 11 are defined in front and rear ends of the upper key piece 10 and two second screw holes 21 respectively corresponding to the two first screw holes 11 of the upper key piece 10 are defined in the lower key piece 20 so that the upper key piece 10 and the lower key piece 20 are combined together with screws 30 extending through aligned pairs of the first and second screw holes 11,21. Another advantage to have the upper key piece 10 and the lower key piece 20 for the key is that it is easy to uninstall the disk 40 from the key by simply releasing the lower key piece 20 from the upper key piece 10.

The disks 40 that are installed into the through holes 12–22 of the key are selected from two types of disks, one is penetrable by light ray such as infrared light and the other is non-penetrable by the light ray. Therefore, by installing different types of disks, different disk arrangements are formed for the key. Consequently, a key is specified with its own disk arrangement and different keys can be distinguished by having different key arrangements.

Figure 3:
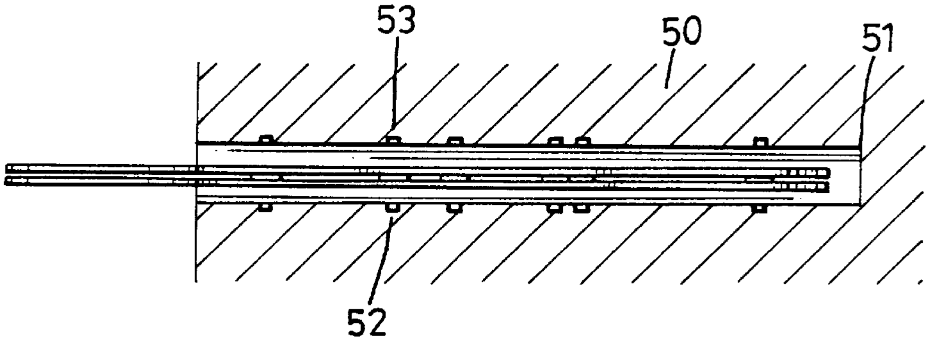
FIG. 3 is a cross sectional view of a lock in accordance with the present invention.

FIG. 3 shows the internal architecture of a lock 50 with the key in accordance with the present invention inserted into a keyhole 51 of the lock 50. Along with the key hole 51 in the lock 50, there is a plurality of transmitters 52 at one side of the key hole 51 and a plurality of receivers 53 at an opposite side of the key hole 51 respectively corresponding to the transmitters 52 so that the receivers 53 may receive infrared light (or other types of light ray) from the transmitters 52 through the disks 40 of the inserted key if the disks 40 between the transmitters 52 and the receivers 53 are penetrable. Therefore, the disk arrangement of an inserted key can be known by detecting whether or not the receivers 53 have received infrared light from corresponding transmitters 52.

Figure 4:
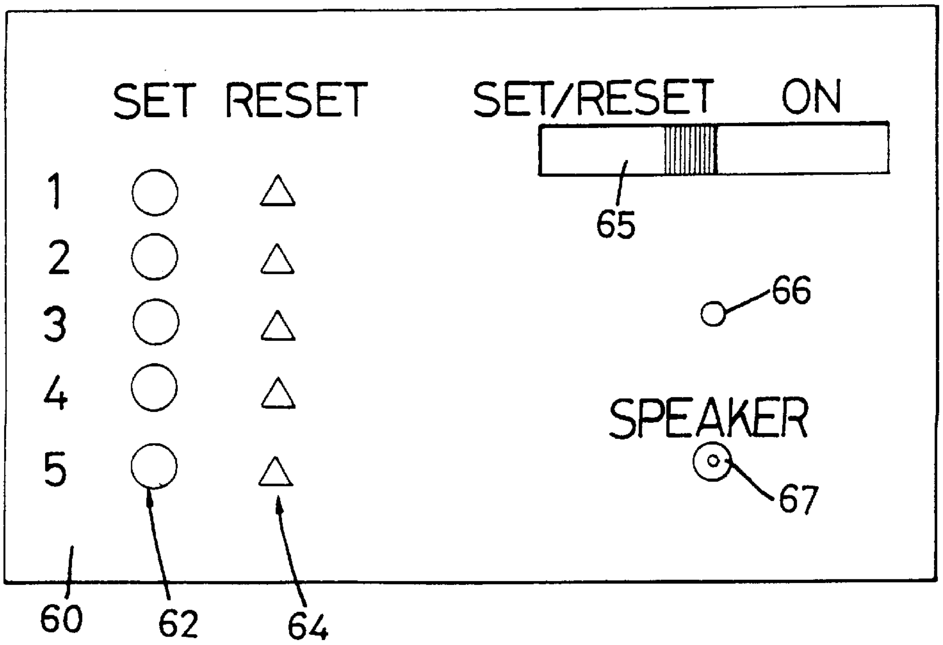
FIG. 4 is a plane view of a panel of a lock in accordance with the present invention.

Further referring to FIG. 4 which shows a control panel 60 of the lock 50, on the left side of the control panel 60, there are a first row of set indication lamps 62 and a second row of reset indication lamps 64 respectively numbered from 1 to 5 provided on the panel 60. On the right side of the panel 60, a switch button 65 is provided for switching the lock 50 between a SET/RESET state and an ON state. Moreover, below the switch button 65, a power low indicator 66 and a speaker 67 are provided.

For setting the lock 50 to identify a key, the lock 50 is enabled to detect and store the disk arrangement of the key.

Figure 5:
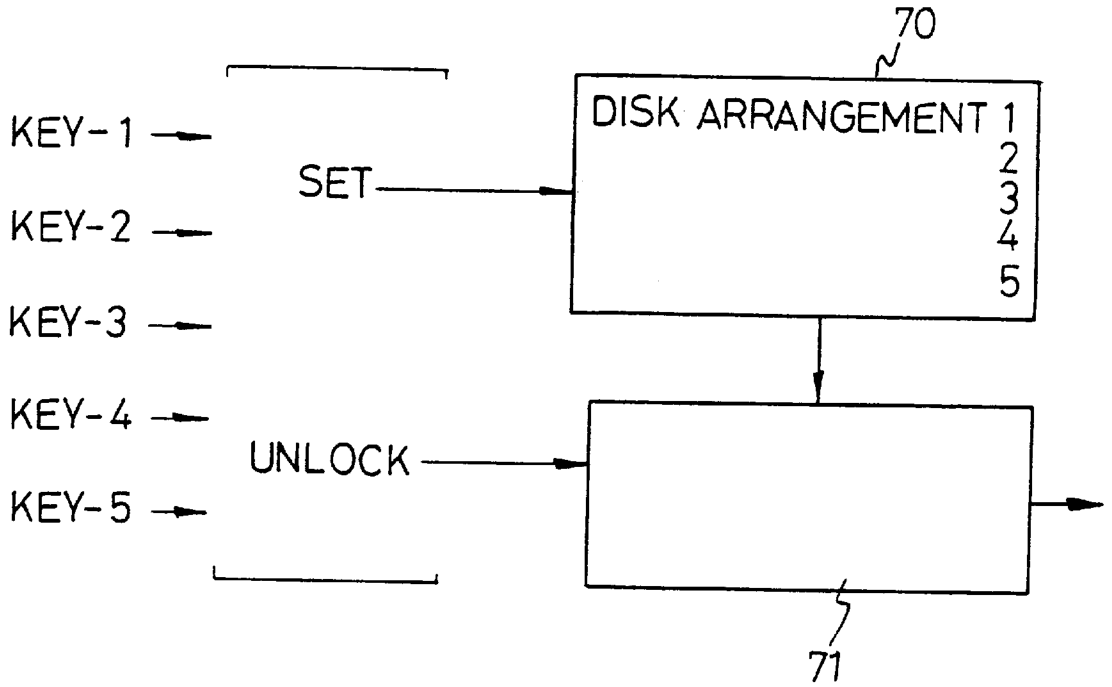
FIG. 5 is schematic diagram showing the setting of a key and unlocking in accordance with the present invention.

This can be implemented by operating the control panel 60 of the lock. Referring to FIG. 4 and FIG. 5, to set the lock 50 for identifying the first key, the switch button 65 is switched to the SET/RESET state and the first one of the reset indication lamps 64 is pressed whereby the first one of the set indication lamps 62 is on. The first one of the set indication lamps 62 is then pressed and the key is inserted for setting. When the disk arrangement of the inserted key has been detected and stored, the speaker 67 buzzes and the first one of the set indication lamps 62 is off to indicate that the setting is done. The lock 50 can be set to identify several different keys in the same way and the detected disk arrangements of keys that can be identified by the lock 50 are stored in a memory device 70 of the lock 50. In addition, several different locks can be set to identify one key in the same way.

When a key is inserted into the keyhole 51 of the lock 50 for unlocking a door, as shown in FIGS. 3 and 5, the disk arrangement of the inserted key is detected and compared with the disk arrangements stored in the memory device 70 by a comparing device 71 of the lock 50. The door equipped with the lock 50 is opened if the disk arrangement of the inserted key matches any of the stored disk arrangements. Otherwise, the door remains locked and an alarm is generated for altering residents, office, etc.

Therefore, according to the above description, the present invention has the following advantages:

1. It is possible for one key to work with several different locks and thus it is necessary to bring only one key even though there may be many doors to be opened in a resident, office, etc.

2. The disk arrangement of a key can be set by users themselves and thus the security of the key is increased.

3. If the key of the present invention is lost, no locksmith is required as users can set the lock and the disk arrangement of the key by themselves so that the lock is not required to be replaced.

4. A landlord can set a different disk arrangement for the key that is used by a previous tenant to prevent the potential intruders when tenants are changed.

5. When a key that cannot be identified by the lock is inserted, an alarm shall be generated. Therefore, the protection ability of the lock is enhanced.

What is claimed is:

1. A method for setting a lock to identify a key for unlocking a door comprising the steps of:

installing a first plurality of disks, which are penetrable by light ray, and a second plurality of disks, which are non-penetrable by said light ray, to a plurality of through-holes in said key for setting a disk arrangement for said key, said key cooperating with a lock having a plurality of trasmitters and a plurality of receivers respectively corresponding to said r transmitters in a key hole of said lock for transmitting and receiving said light ray through said disk;

enabling said lock to detect and store said disk arrangement of said key, by setting a switch button on a control panel to a SET/RESET state and pressing a reset indication lamp on said panel thereby to light on a set indication lamp correspond to said reset indication lamp;

pressing said set indication lamp;

inserting said key into said lock and detecting said disk arrangement of said key by said transmitters and receivers and storing the detected disk arrangement in a memory device of said lock; and unlocking a door equipped with said lock by inserting said key into said keyhole of said lock and comparing said disk arrangement of said key with disk arrangements stored in said memory device of s aid lock.

2. The method for setting a lock to identify a key for unlocking a door as claimed in claim 1, further comprising a step of generating an alarm when said disk arrangement of an inserted key does not match any of disk arrangements stored in said memory device.

3. A The method for setting a lock to identify a key for unlocking a door as claimed in claim 2, wherein said light ray is infrared light.

4. A key with a disk arrangement comprising:

an upper key piece having a plurality of holes;

a lower key piece releasably secured to said upper key piece and having a plurality of holes corresponding to said holes of said upper key piece one by one to form a plurality of through holes; and a first plurality of disks, which are penetrable by light ray, and a second plurality of disks, which are non-penetrable by said light ray, installed in said through holes to form said disk arrangement.

5. The key with a disk arrangement as claimed in claim 4, wherein each of the upper and lower key pieces has a front end and a rear end and two screws are each provided to secure the front ends and the rear ends, respectively.

6. The key with a disk arrangement as claimed in claim 5, wherein said light ray is infrared light.

* * * * *